(12) United States Patent
Lo et al.

(10) Patent No.: US 10,579,334 B2
(45) Date of Patent: Mar. 3, 2020

(54) BLOCK FLOATING POINT COMPUTATIONS USING SHARED EXPONENTS

(71) Applicant: Microsoft Technology Licensing, LLC, Redmond, WA (US)

(72) Inventors: Daniel Lo, Bothell, WA (US); Eric Sen Chung, Woodinville, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 11 days.

(21) Appl. No.: 15/974,643

(22) Filed: May 8, 2018

(65) Prior Publication Data
US 2019/0347072 A1 Nov. 14, 2019

(51) Int. Cl.
| G06F 7/483 | (2006.01) |
| G06F 7/499 | (2006.01) |
| G06F 7/523 | (2006.01) |
| G06F 7/491 | (2006.01) |

(52) U.S. Cl.
CPC ........ *G06F 7/49947* (2013.01); *G06F 7/4915* (2013.01); *G06F 7/49936* (2013.01); *G06F 7/523* (2013.01)

(58) Field of Classification Search
None
See application file for complete search history.

(56) References Cited

U.S. PATENT DOCUMENTS

| 10,167,800 | B1* | 1/2019 | Chung | F02D 41/1405 |
| 2009/0292750 | A1* | 11/2009 | Reyzin | G06F 7/483 |
| | | | | 708/209 |
| 2018/0157465 | A1* | 6/2018 | Bittner | G06F 7/483 |
| 2019/0057303 | A1* | 2/2019 | Burger | G06N 3/0635 |

OTHER PUBLICATIONS

Chung, et al., "Hardware Node Having a Matrix Vector Unit with Block-Floating Point Processing" Application as Filed in U.S. Appl. No. 15/680,649, filed Aug. 18, 2017, 45 Pages.
Drumond, et al., "End-to-End DNN Training with Block Floating Point Arithmetic", In Journal of the Computing Research Repository, Apr. 4, 2018, 9 Pages.
(Continued)

*Primary Examiner* — David H Malzahn

(57) ABSTRACT

A system for block floating point computation in a neural network receives a plurality of floating point numbers. An exponent value for an exponent portion of each floating point number of the plurality of floating point numbers is identified and mantissa portions of the floating point numbers are grouped. A shared exponent value of the grouped mantissa portions is selected according to the identified exponent values and then removed from the grouped mantissa portions to define multi-tiered shared exponent block floating point numbers. One or more dot product operations are performed on the grouped mantissa portions of the multi-tiered shared exponent block floating point numbers to obtain individual results. The individual results are shifted to generate a final dot product value, which is used to implement the neural network. The shared exponent block floating point computations reduce processing time with less reduction in system accuracy.

20 Claims, 9 Drawing Sheets

(56) References Cited

OTHER PUBLICATIONS

Drumond, et al., "Training DNNs with Hybrid Block Floating Point", In Proceedings of the Neural Information Processing Systems, Apr. 4, 2018, 11 Pages.

Koster, et al., "Flexpoint: An Adaptive Numerical Format for Efficient Training of Deep Neural Networks", Retrieved from https://papers.nips.cc/paper/6771-flexpoint-an-adaptive-numerical-format-for-efficient-training-of-deep-neural-networks.pdf, Nov. 6, 2017, 11 Pages.

"International Search Report and Written Opinion Issued in PCT Application No. PCT/US2019/029526", dated Jul. 24, 2019, 11 Pages.

* cited by examiner

BLOCK FLOATING POINT COMPUTATIONS USING SHARED EXPONENTS

BACKGROUND

Block floating point numeric format allows for scaling dynamic range and precision independently. By lowering precision, system performance of processors, such as of hardware accelerators, can be increased. However, lowered precision can affect system accuracy. For example, block floating point numeric format can be used in neural networks that may be implemented in many application domains for tasks such as computer vision, robotics, speech recognition, medical image processing, computer games, augmented reality, virtual reality and others. While the lowered precision can increase the performance in different functions of the neural network, including the speed at which classification and regression tasks for object recognition, lip reading, speech recognition, detecting anomalous transactions, text prediction, and many others can be performed, neural network accuracy can be adversely affected.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A computerized method for block floating point computation in a neural network comprises receiving a plurality of floating point numbers each comprising a mantissa portion and an exponent portion, and converting the plurality of floating point numbers to a plurality of multi-tiered shared exponent block floating point numbers having at least one global shared exponent and one additional exponent for each of a plurality of grouped mantissas. The method further includes performing one or more dot product operations using the plurality of multi-tiered shared exponent block floating point numbers and using a result of performing the one or more dot product operations to implement the neural network.

Many of the attendant features will be more readily appreciated as the same becomes better understood by reference to the following detailed description considered in connection with the accompanying drawings.

BRIEF DESCRIPTION OF THE DRAWINGS

The present description will be better understood from the following detailed description read in light of the accompanying drawings, wherein.

Corresponding reference characters indicate corresponding parts throughout the drawings. In the figures, the systems are illustrated as schematic drawings. The drawings may not be to scale.

DETAILED DESCRIPTION

The computing devices and methods described herein are configured to perform block floating point computations using multi-tiered shared exponents. For example, sub-vector components having mantissas with shared exponents at both a global level and a finer grain level (or finer granularity) are clustered allowing for computations to be performed with integers. In some examples, a finer granularity of block floating point exponents allows for a great effective precision of the values expressed. As a result, a computational burden is reduced, while improving an overall accuracy.

With various examples of the present disclosure, neural networks, such as deep neural networks (DNNs), can be trained and deployed using block floating point or numeric formats of lower precision than single-precision floating-point formats (e.g., 32-bit float) with minimal or reduced loss in accuracy. On specialized hardware, such as field-programmable gate arrays (FPGAs), the reduced precision formats implemented by the present disclosure can greatly improve the latency and throughput of DNNs. Additionally, various examples perform calculations with the lower precision floating point numeric format (e.g., 16-bit float or fixed-point formats) yet have improved accuracy. That is, a lower precision format can be used without the traditionally accompanying loss of accuracy. As a result, processing time and processing resources for training and operating the neural network are reduced without the expected decrease in system accuracy. In this manner, when a processor is programmed to perform the operations described herein, the processor is used in an unconventional way, and allows for the more efficient training or operation of the neural network.

Figure 1:
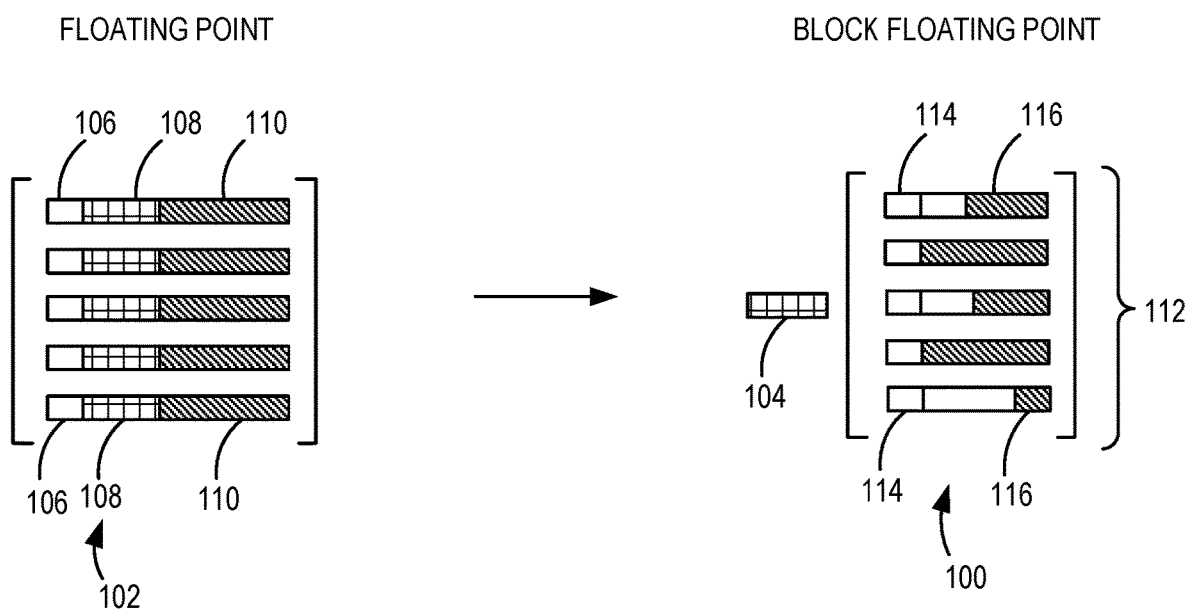
FIG. 1 is an exemplary block diagram illustrating a block floating point format according to an embodiment.

With reference to FIG. 1, a block floating point format 100 that is a derived or modified version of a floating point format 102 is modified or converted to have a shared exponent 104. That is, in the floating point format 102, each number is expressed with a sign 106, an exponent 108, and a mantissa 110. With the block floating point format 100, a group of numbers 112 uses the shared exponent 104 as a single shared exponent component with each number still having a sign 114 and a mantissa 116. The shared exponent 104 in various examples comprises a two-tiered shared exponent arrangement wherein the shared exponent at one or more of the tiers is selected to be the largest exponent of the original floating point values, in particular, of the group of numbers 112. However, other criteria may be used to determine the shared exponent, such as based on a minimum of the exponent values or an average of the exponent values. It should be noted that some bits of the mantissa 116 are lost if the shared exponent 104 and a value of the original floating-point exponent do not match. As discussed in more detail herein, this occurs because the mantissa 116 is shifted to correspond to the new shared exponent 104.

Figure 2:
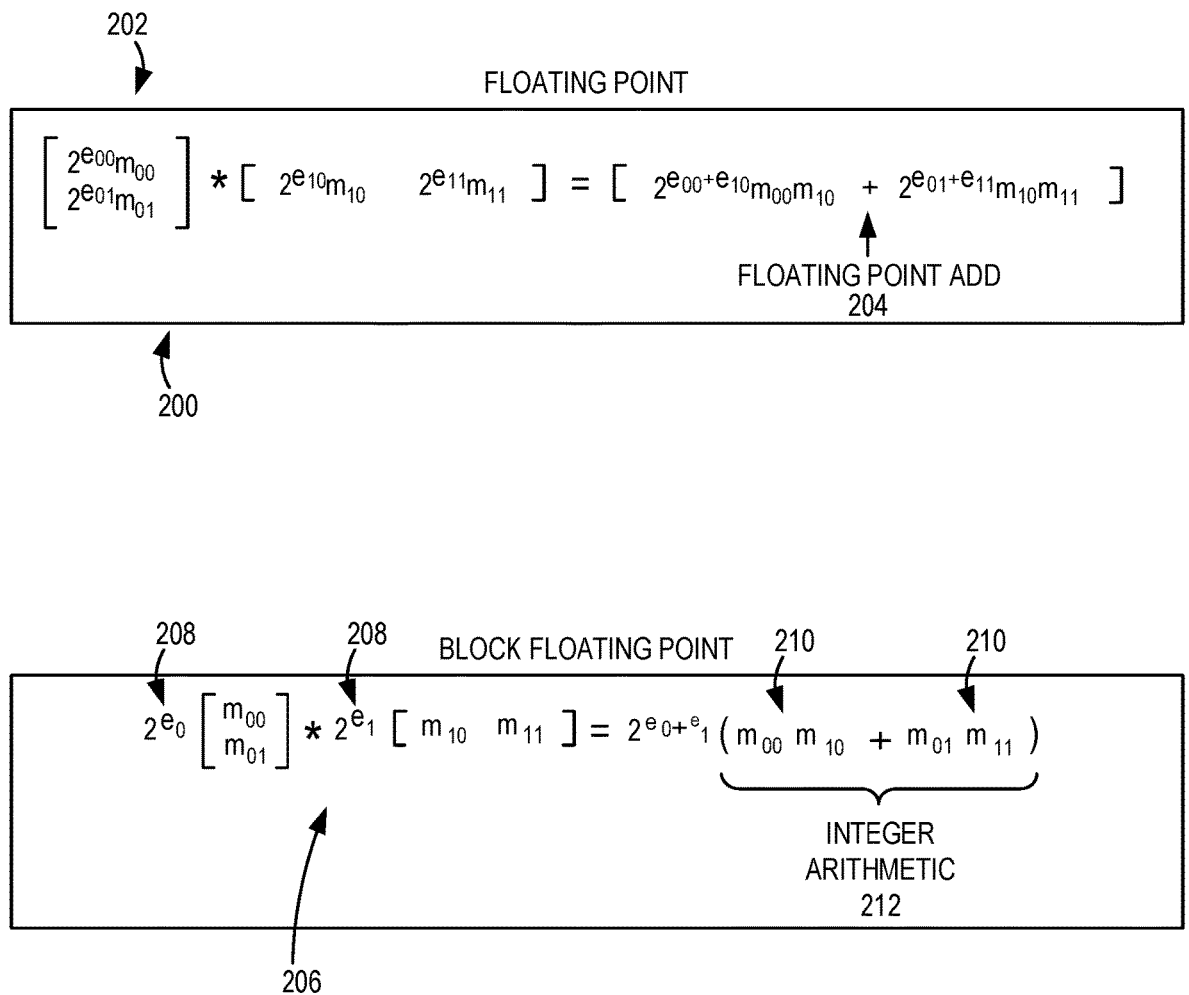
FIG. 2 illustrates floating point operations with a shared exponent according to an embodiment.

The block floating point format 100 using the multi-tiered shared exponent reduces the processing burden, such as when performing dot product operations, including when training or operating a neural network. That is, the computational requirements for a dot product of two block floating point vectors is less than the dot product of two floating point vectors, with a finer granularity resulting from the multi-tiered shared exponent arrangement. For example, in a dot product 200 of floating point vectors 202 as illustrated in FIG. 2, the summation is performed in floating point, illustrated as a floating point add operation 204, which can require shifts to align values with the different exponents for each of the mantissas.

With the present disclosure, a block floating point format for the dot product 206 uses values in each vector with shared exponents 208, which in various examples includes the multi-tiered exponents. As described herein, a global exponent portion can be factored out as described in more detail herein with a finer granularity exponent shared among each of a set of grouped mantissas 210. The result is that the multiplication and addition of the mantissas 210 is performed entirely in fixed point, illustrated as an integer arithmetic operation 212. As such, a large dynamic range can be maintained with the shared exponents 208 while having the reduced "cost" (computational requirement) of integer arithmetic when using the multi-tiered shared exponents. For example, in a neural network application, most of the computation "cost" of DNNs is in matrix-vector and matrix-matrix multiplications. These operations are quadratic in input sizes, while operations such as bias add and activation functions are linear in input size. Thus, in some examples, block floating point is only applied to matrix-vector multiplies on FPGAs (matrix-matrix multiplication is done as multiple matrix-vector multiplies). All other operations are performed in a lower precision floating-point numeric format (e.g., 16-bit float or 8-bit float). In one example, 16-bit float values are input and processed to generate 16-bit float output values. It should be noted that all conversion to and from block floating point format in some examples are performed within the FPGA.

Figure 3:
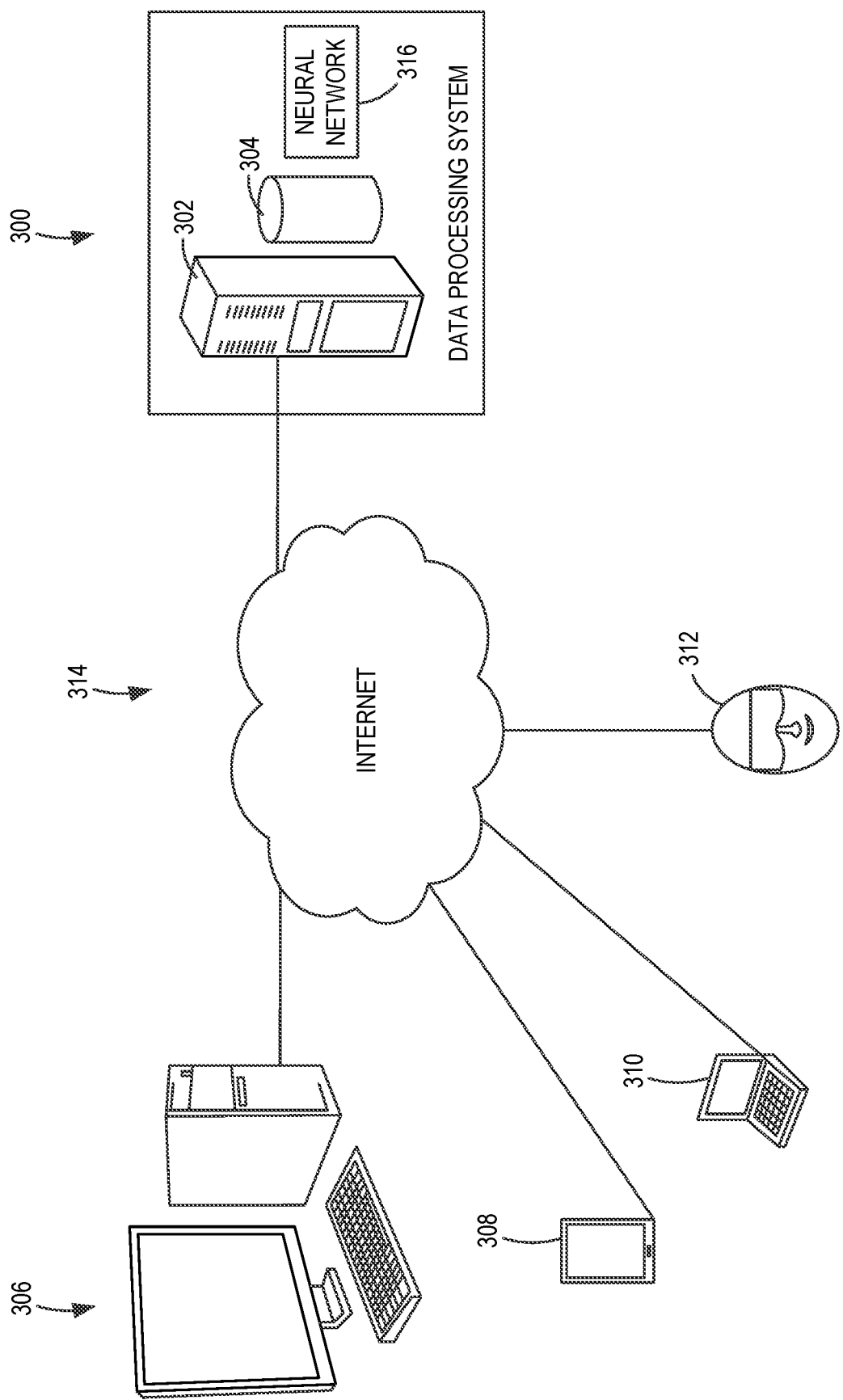
FIG. 3 is an exemplary block diagram illustrating a data processing system according to an embodiment.

FIG. 3 is a schematic block diagram of a data processing system 300 (e.g., an image processing system) deployed as a cloud service in this example that can implement the shared exponent block floating point processing described herein. The data processing system 300 includes one or more computers 302 and storage 304 to store neural network data, including training data (e.g., polygon data meshes or numerical training values) and/or trained model data in some examples. It should be appreciated that other data, such as neural network inference data, or other non-neural network data can be stored in the storage 304 and processed by the one or more computers 302 using the present disclosure.

The data processing system 300 is connected to one or more end user computing devices in some examples, such as a desktop computer 306, a smart phone 308, a laptop computer 310 and an augmented reality head worn computer 312 (e.g., Microsoft HoloLens®). For example, the data processing system 300 is shown as connected to the end user computing devices via a computer network 314, illustrated as the Internet.

The data processing system 300 receives input data, such as neural network inputs (e.g., numerical data, image data, etc.) from an end user computing device or server. The data is uploaded to the data processing system 300 for processing, such as for neural network inference processing using shared exponent block floating point computations as described herein. It should be appreciated that some or all of the data processing system 300 or the functionality of the data processing system 300 can be implemented within the end user computing device.

The data processing system 300 implements a neural network 316 that performs computations (or is optionally trained) according to the present disclosure using a shared exponent block floating point computation engine. When the neural network 316 is trained, a large amount of data (e.g., three-dimensional (3D) objects) can be processed and stored in a database, such as in the storage 304, which can be processed more quickly with less reduction in accuracy according the present disclosure. In some examples, the functionality of the data processing system 300 described herein is performed, at least in part, by one or more hardware logic components. For example, and without limitation, illustrative types of hardware logic components that are used include FPGAs, Application-specific Integrated Circuits (ASICs), Application-specific Standard Products (ASSPs), System-on-a-chip systems (SOCs), Complex Programmable Logic Devices (CPLDs), Graphics Processing Units (GPUs).

Figure 4:
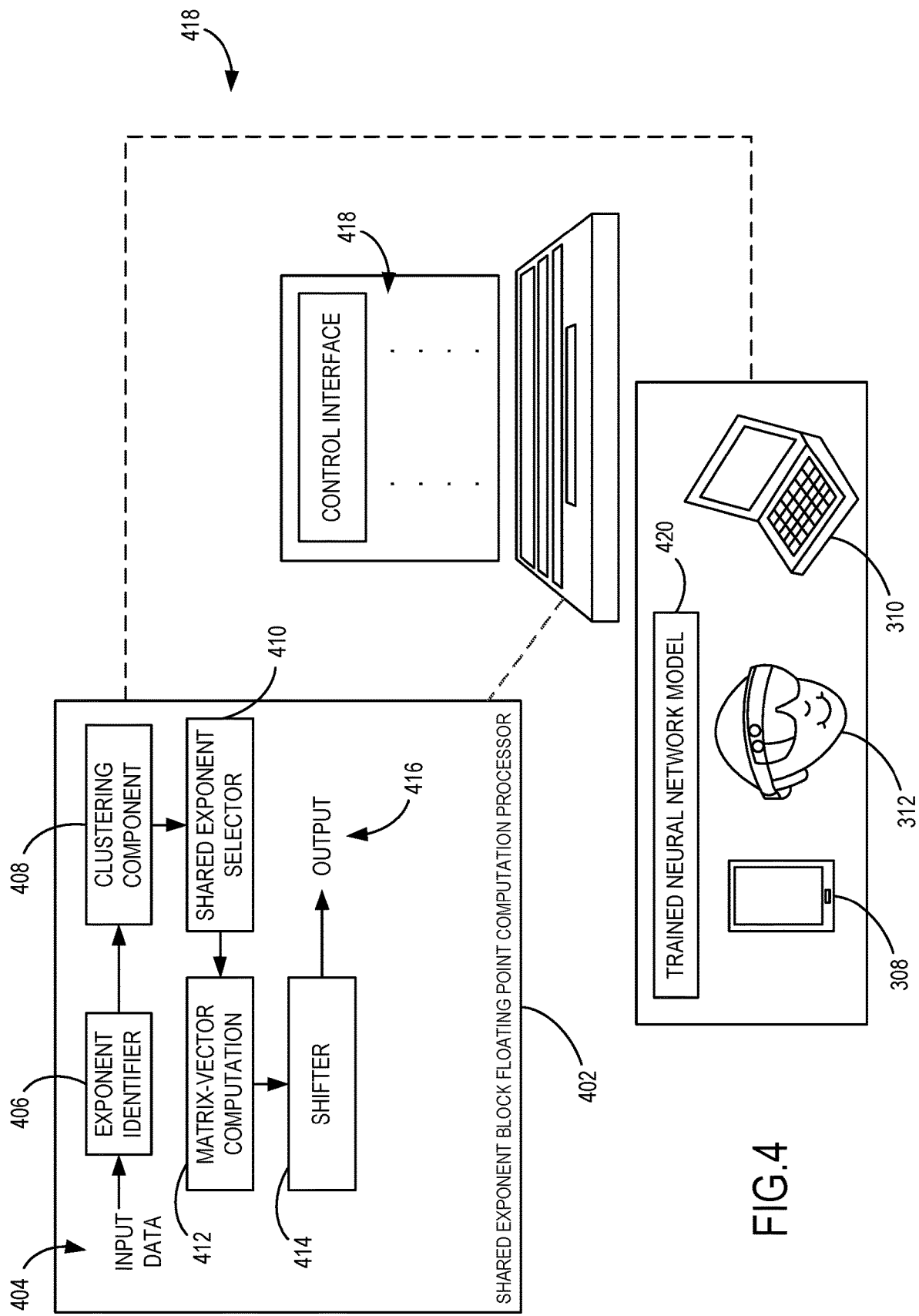
FIG. 4 is an exemplary schematic block diagram of a neural network system according to an embodiment.

Various examples include a neural network system 400 as illustrated in FIG. 4. The neural network system 400 in one example uses back propagation and/or other training techniques as described herein. The neural network system 400 includes a shared exponent block floating point computation processor 402 that is configured in some examples as a processing engine that uses sub-vector exponents with multi-tiered shared exponents for block floating point calculations. That is, multiple levels of shared exponents having different granularity are used in various examples.

The shared exponent block floating point computation processor 402 has access to input data 404, such as inference data or training data. For example, the shared exponent block floating point computation processor 402 accesses DNN model data (e.g., formatted as floating point data) as the input data 404 for use in classification and regression tasks in a wide variety of application domains such as object recognition, lip reading, speech recognition, detecting anomalous transactions, text prediction, and many others. In another example, the shared exponent block floating point computation processor 402 accesses training data for training the neural network using neural network processing technology. The shared exponent block floating point computation processor 402 uses shared exponent processing to reduce the processing time for performing inference, training, or other operations, while maintaining a system accuracy.

In the illustrated example, the input data 404 includes a plurality of floating point numbers each comprising a mantissa portion and an exponent portion. The block floating point computation processor 402 initially processes the input data 404 with an exponent identifier component 406 (which may be configured as a sub-module of the block floating point computation processor 402) that is configured to identify an exponent value for the exponent portion of each floating point number of the plurality of floating point numbers. That is, for each mantissa 116 in the group of numbers 112 (both shown in FIG. 1), the exponent identifier component 406 identifies the corresponding exponent value for each.

A clustering component 408 is configured to then group the mantissas of the floating point numbers. In one example, the mantissas are grouped spatially (e.g., first sixteen values, the next sixteen values, etc.). However, the mantissas can be grouped using other criteria. For example, the mantissas in some examples are grouped based on the identified exponent values. For example, sub-vector components (of input vectors) having mantissas with shared exponents are clustered, such as illustrated in FIG. 2. It should be noted that this clustering is performed in some examples such that the floating point numbers are in the block floating point format 100 (shown in FIG. 1) and applied only to matrix-vector multiplication operations (with matrix-matrix multiplications performed as multiple matrix-vector multiplication operations).

Figure 5:
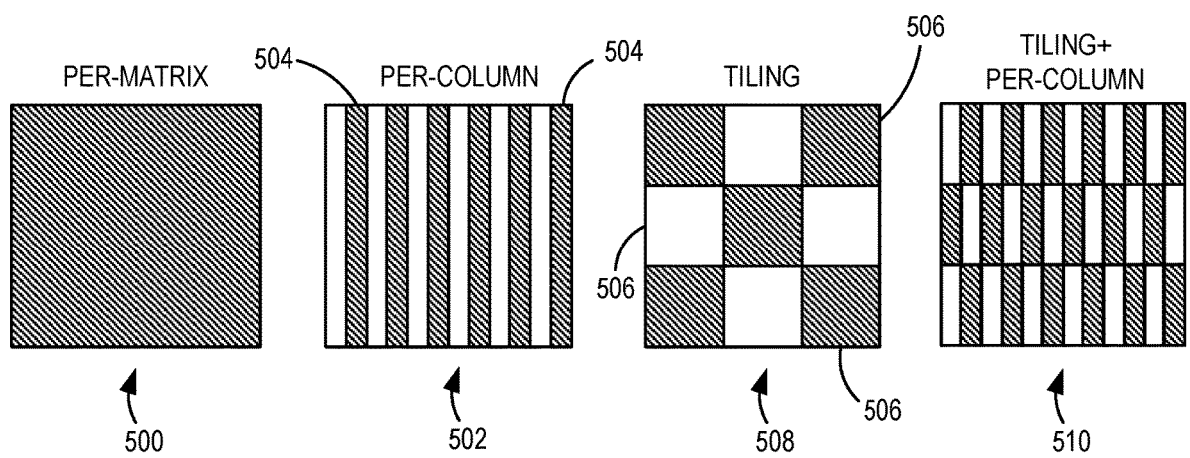
FIG. 5 illustrates matrix sharing configurations according to an embodiment.

The present disclosure contemplates different criteria to use to determine the sub-vector components having the mantissas that will have the shared exponent (or for determining the global exponent). The criteria can be separately applied or a combination thereof can be applied. As one example, an entire matrix or vector can share an exponent to define a per-matrix sharing 500 as illustrated in FIG. 5. In this example, all of the sub-vector components in the matrix share the same exponent (i.e., have the same shared exponent 104). Sharing an exponent over a finer granularity can reduce errors because such an arrangement increases the likelihood of values using a shared exponent that is closer to an original floating point exponent for the sub-vector components.

As another example, a per-column sharing 502 is used. In this example, each of a plurality of columns 504 is clustered to define the shared exponent granularity. In particular, by multiplying a row-vector x by matrix W, y=xW, if an exponent for each column 504 of W is shared, then each dot-product $xW_j$ (where $W_j$ is the j-th column 504 of W) only involves one shared exponent for x and one shared exponent for $W_j$.

As another example, matrices of arbitrary sizes are supported by sub-dividing, for example, large matrix computations, into tiles 506 (e.g., tiles of 128×128) in a tiling sharing 508. This tiling sharing 508 also reduces the shared exponent granularity. That is, each matrix-vector of a particular tile 506 uses one shared exponent for the vector tile and one shared exponent for the matrix tile.

As another example, a combination sharing can be used, such as a tiling and per-column sharing 510. In this example, the above-discussed techniques are combined for finer granularity shared exponents that are used in the multi-tier shared exponent arrangement. That is, a shared exponent is used for each column of each tile of a matrix (e.g., a shared exponent is used for every 128 values).

In various examples, the dot product operations compute a scalar product of two vectors, such as $a=[a_1, a_2, \ldots, a_n]$ and $b=[b_1, b_2, \ldots b_n]$, as follows:

$$a \cdot b = \Sigma_{i=1}^{n} a_i b_i = a_1 b_1 + a_2 b_2 + \ldots + a_n b_n \qquad \text{Eq. 1}$$

In Eq. 1, Σ denotes the summation and n is the dimension of the vector space. In operation, a row vector is multiplied by a column vector. In general, the matrix is a rectangular array of numbers, symbols, or expressions that are arranged in rows and columns, and individual items in a matrix are commonly referred to as elements or entries. Matrices are often used to represent linear transformations, that is, generalizations of linear functions such as f(x)=ax. As such, the matrices can be used, for example, to project 3D images onto a two-dimensional (2D) screen or to perform calculations used to create realistic-seeming motion, among many other applications.

The present disclosure can be applied to different matrices, such as a sparse matrix that is a matrix populated primarily with zeros, or a dense matrix that is a matrix where a significant number of elements (e.g. a majority) are not zeros. Sparse matrices are useful in various application areas such as, for example, network theory where it is common to have a low density of significant data or connections represented by non-zero values interspersed throughout a far greater number of zero values. It should further be noted that the present disclosure can be implemented in connection with different types of matrices and is not limited to the matrices described herein. For example, the operations described herein can be performed in combination with different sparse matrix formats, such as a coordinate format, a compressed space row format, or other formats, such as a diagonal sparse matrix format or a bit-vector format.

Referring again to FIG. 4, a shared exponent selector 410 is configured to select a shared exponent for the grouped mantissas. For example, the shared exponent selector 410 selects a global shared exponent of the sub-vector components that are grouped using one or more of the sharing techniques illustrated in FIG. 5. That is, an exponent value is selected to define the tiers or levels of the multi-tiered shared exponent arrangement in some examples. The present disclosure contemplates different criteria for use in selecting the shared exponent. In one example, the shared exponent is determined as the exponent for the grouped mantissas that has the largest absolute value. In this example, the largest absolute value of a vector x is determined by:

$$m = \max(\text{abs}(x)) \qquad \text{Eq. 2}$$

The floating point exponent for this value is then determined by:

$$e_{shared} = \text{floor}(\log_2 m) \qquad \text{Eq. 3}$$

As a result of performing Eqs. 2 and 3, the shared exponent selector determines the exponent having the largest absolute value, which is used as the global shared exponent for the grouped mantissas. However, other criteria can be used to select the global shared exponent. For example, an absolute minimum value or an average value can be determined for the grouped mantissas. It should be appreciated that any criteria can be used, as well as using different possible global shared exponents to determine which exponent provides the most consistent set of offsets. Thus, an exponent offset is defined for a smaller group of numbers using the shared exponent across grouped mantissas.

Using the grouped mantissas with the selected global shared exponent, a matrix-vector computation component 412 computes a dot product value using, for example, the block floating point format 100 (shown in FIG. 1). For example, the matrix-vector computation component 412 performs one or more dot product operations separately on the mantissa portions of each group of the block floating point numbers as illustrated in FIG. 2 to obtain individual results. However, as discussed herein, in various examples, using the block floating point format 100, integer arithmetic multiplication and addition is used for the computations performed with respect to the mantissas. Individual results are thereby obtained for each of the sets of grouped mantissas.

A shifter 414 then shifts each of the individual results based on the shared exponent value to generate a final dot product. It should be noted that in some examples, each sub-vector component has a shift operation applied thereto or has a separate shifter 414 associated therewith. Thus, multiple shifters 414 can be used to maintain the exponent at a smaller bit size (e.g., one to two bits) as the amount of data used in the computations increases. That is, the shifter performs a mathematic shifting operation to adjust for the differences in the shared exponent values for each set of grouped mantissas. The final dot product output, illustrated as the output 416 in FIG. 4 can then be used in the neural network, for example, as part of training or inference operations.

Figure 6:
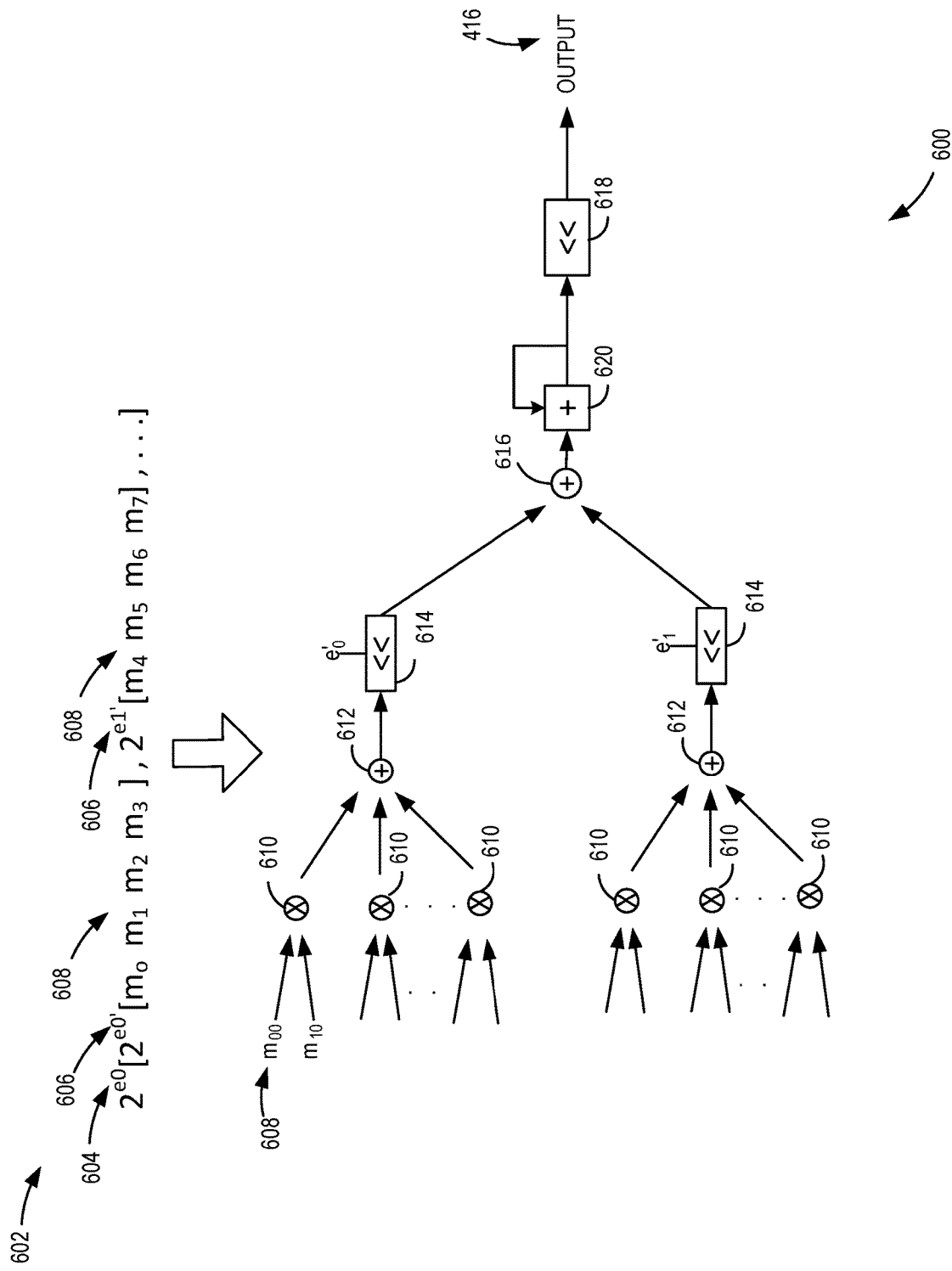
FIG. 6 is an exemplary block diagram illustrating multi-tiered shared exponent block floating point computations according to an embodiment.

For example, the block floating point computation processor 402 is configured to perform shared exponent computations 600 as illustrated in FIG. 6. In the illustrated example, a dot product operation 602 to be performed is computed using a block floating format having a global shared exponent 606 and finer granularity shared exponents 608 for each of the grouped mantissas (e.g., a local exponent for each group of mantissas) to define the multi-tier shared exponent arrangement. As described herein, the shared exponent 606 allow the computations to be performed with integers using sub-vector components. As can be seen, the mantissas 608 for each grouped set of mantissas 608 can be combined using multiplication functions 610 and then combined with accumulation functions 612. Thus, individual results are obtained that are shifted with shifters 614 (which can be accumulated by a final accumulation function 616) that are then shifted by a shifting operation 618 (as described in more detail herein) to generate the output 416. It should be noted that a plurality of outputs 416 can then be multiplied and shifted. Additionally, the results of multiple iterations of the operations can be accumulated using an accumulator 620.

Thus, in the shared exponent computations 600, one tier of the multi-tiered shared exponents can be determined at a smaller granularity, as follows:

$$[2^{e0}m_0 2^{e1}m_1 \ldots 2^{eN}m_N] \quad \text{Eq. 4}$$

$$[2^{e_a}[m_0 m_1 m_2 m_3] 2^{e_b}[m_4 m_5 m_6 m_7]] \quad \text{Eq. 5}$$

$$2^{\bar{e}}[2^{e'_a}[m_0 m_1 m_2 m_3] 2^{e'_b}[m_4 m_5 m_6 m_7] \ldots ] \quad \text{Eq. 6}$$

In the above equations, $e_a = \bar{e} + e'_a$ and $e'_a = e_a - \bar{e}$, where m represents the mantissas and e represents the exponents, with 6 being the shared or global exponent. Eq. 5 illustrates a determination of exponents based on Eq. 4, but at a smaller granularity. An aggregate exponent (e.g., shared exponent) is then determined as illustrated by Eq. 6. Thus, using shared exponents, the exponent 6 has more bits (e.g., 5-8 bits) than the each of the exponents $e'_a$ and $2^{e'_b}$ (e.g., 1-2 bits each). For example, in accordance with the present disclosure, $[2^5 1.010_2 \, 2^5 \, 1.111_2 \, 2^4 \, 1.110_2 \, 2^4 \, 1.001_2]$ has mantissas grouped as $[2^5[1.010_2 \, 1.111_2] \, 2[1.110_2 \, 1.001_2]]$ and then a global shared exponent is determined to be $2^4$, resulting in $2^4[2^1 [1.010_2 \, 1.111_2] \, 2^0[1.110_2 \, 1.001_2]]$ with both a global shared exponent and a finer granularity shared exponent for each set of grouped mantissas, which is computed using multiplication and accumulation operations, such as shown in FIG. 6.

With reference again to FIG. 4, the shared exponent block floating point computation processor 402 is configured to use the multi-tiered shared exponent with the block floating point format 100 to reduce the complexity and processing burden, while reducing a loss in accuracy. As a result, when processing a large set of data, latency is reduced, without as much reduction in accuracy. For example, the shared exponent block floating point computation processor 402 is configured to use the multi-tiered shared exponent computations for matrix-vector multiplication operations. These operations can be performed as part of performing inference functions for a neural network. As another example, the operations can be performed as part of a training process for the neural network, such as when performing computations during the forward pass, back propagation and weight updating in the training process.

In one example, the shared exponent block floating point computation processor 402 has details of the neural network topology (such as the number of layers, the types of layers, how the layers are connected, the number of nodes in each layer, the type of neural network), which can be specified by an operator. For example, an operator is able to specify the neural network topology using a graphical user interface 418. When the neural network is trained, a large amount of 3D objects can be processed and stored in a database. For example, the database can include identifiers corresponding to thousands of 3D objects in an image processing application.

Once the operator has configured one or more inference or training tuning parameters, or in some cases, using a predefined set of parameters (that can be automatically selected), the shared exponent block floating point computation processor 402 is configured to perform neural network inference or training computations to operate or train the neural network using neural network functions or neural network training processes in the neural network technology. It should be noted that in examples where neural network training is performed, once the training is complete (for example, after the training data is exhausted) a trained neural network model 420 (topology and parameter values) is stored and loaded to one or more end user devices such as the smart phone 308, the wearable augmented reality computing device 312, the laptop computer 310 or other end user computing device. The end user computing device is able to use the trained neural network model 420 to carry out the task for which the neural network has been trained. For example, in the case of the wearable augmented reality computing device 312, an engine is opened to recognize assets being looked at by the wearer of the wearable augmented reality computing device 312 and the trained neural network model 420 is used to understand how the assets are oriented, whether the asset is opened, etc.

In various examples, to handle shared exponents over granularities finer than an entire tensor, the tensor is reshaped or split into smaller tensors before applying the operations to determine the shared exponents. Reshaping allows the operations to be applied independently along certain axes, while splitting allows the operations to be applied independently to each split tensor. A tensor is generally a geometric object that describes linear relations between geometric vectors, scalars, and other tensors. Examples of such relations include the dot product, the cross product, and linear maps.

When the present disclosure is applied, for example, to a DNN, in one example, pre-trained model parameters are used in a quantized model. The quantized model uses the operators described herein to model the quantization error around matrix-vector multiplies. It should be noted that quantized model quantizes both the model parameters as well as the activations in the network. The resulting model is then used to run inference on validation or new data to determine the accuracy of the quantized model.

If the accuracy does not meet a predefined threshold, the accuracy is further improved through fine tuning. In this case, the quantized model is used to fine tune the model parameters. Again, the model parameters are initialized using the ones trained in floating point. Training data is then run through the model, using the losses from the quantized model to further train the model.

Thus, the above-described shared exponent block floating point computations can be used in many different applications performed with less latency, while still maintaining a level of precision. As such, finer-grained shared exponents can be realized efficiently on, for example, a block floating point accelerator that can improve accuracy.

Figure 7:
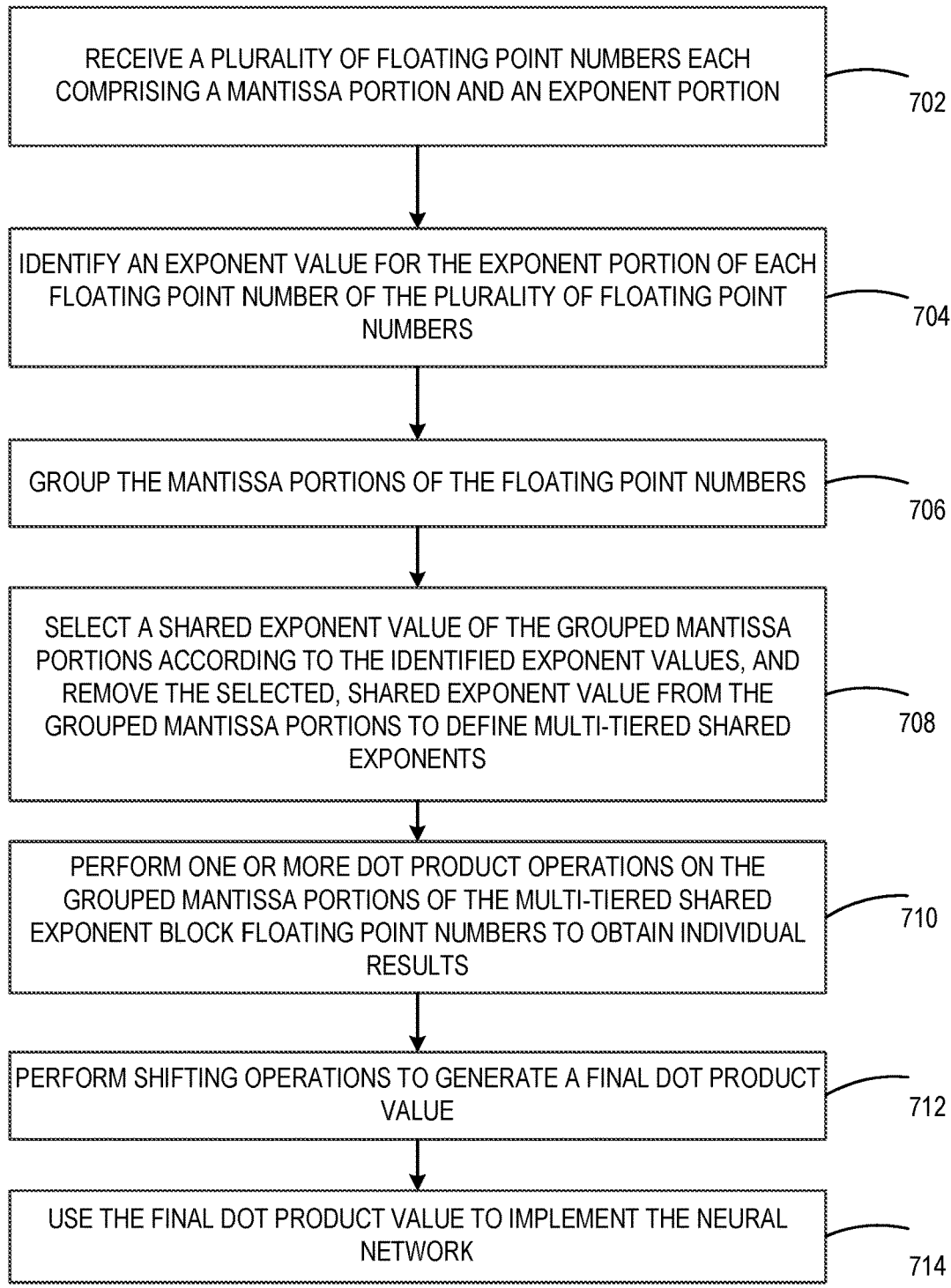
FIG. 7 is an exemplary flow chart illustrating operations of a computing device for performing multi-tiered shared exponent block floating point computations according to various embodiments.
Figure 8:
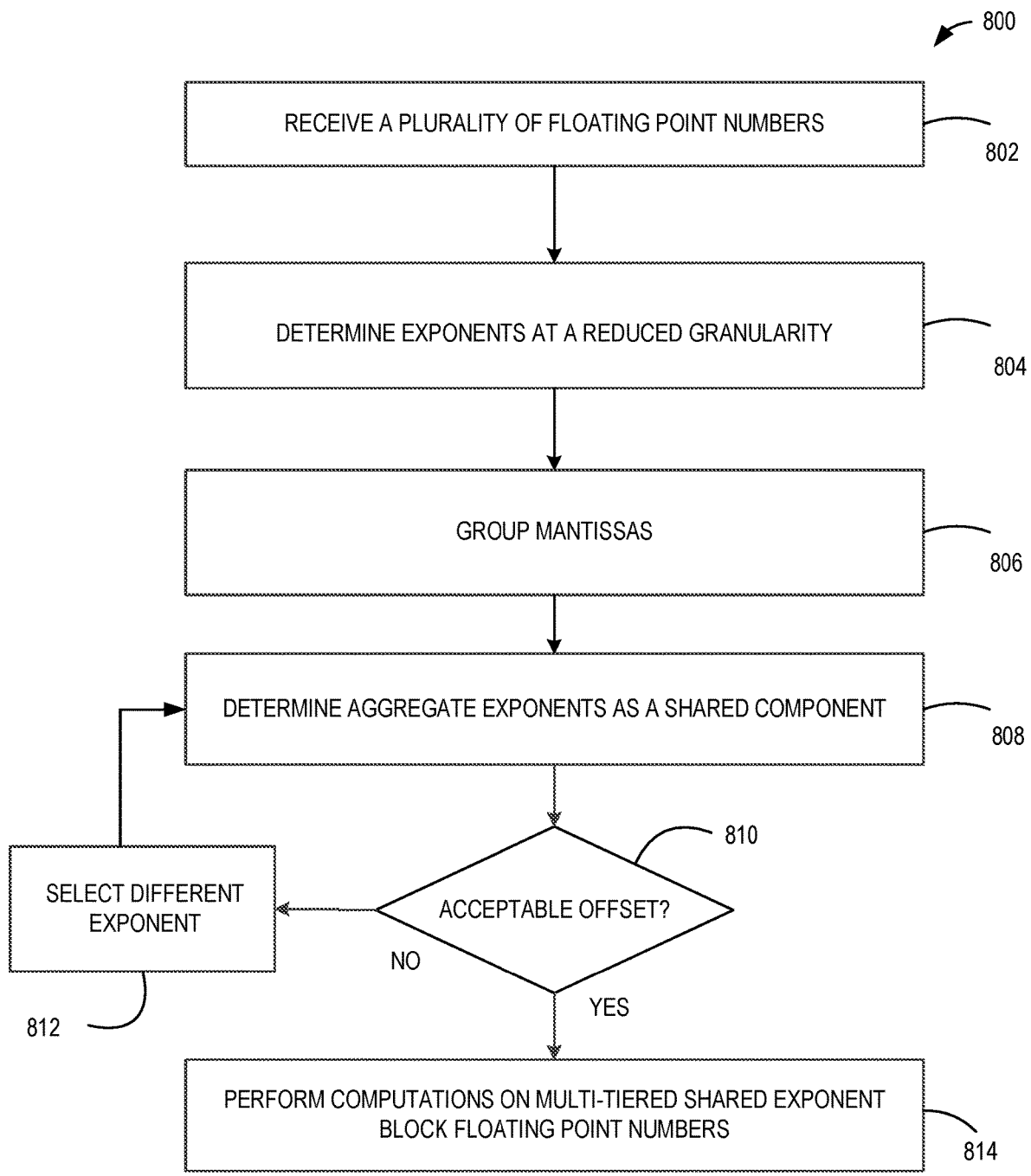
FIG. 8 is another exemplary flow chart illustrating operations of a computing device for performing shared exponent block floating point computations according to various embodiments.

As should be appreciated, the various examples can be used to train or in the operation of different types of neural networks. Additionally, the various examples can be used to perform shared exponent block floating point computations in non-neural applications. FIGS. 7 and 8 illustrate exemplary flow charts of methods 700 and 800 for performing shared exponent block floating point computations in a neural network. The operations illustrated in the flow charts described herein can be performed in a different order than is shown, can include additional or fewer steps and can be modified as desired or needed. Additionally, one or more operations can be performed simultaneously, concurrently or sequentially.

With reference to the method 700, the computing device receives a plurality of floating point numbers at 702. Each of the floating point numbers comprises a mantissa portion and an exponent portion (and a sign portion in various examples). For example, a plurality of floating point numbers as part of a matrix (e.g., matrix values in a floating point format) are received and on which dot product operations are to be performed. For example, the received numbers have the floating point format 102.

The method 700 further identifies an exponent value for the exponent portion of each floating point number of the plurality of floating point numbers at 704. In this operation, each of the different exponent values corresponding to the mantissas for each of the floating point numbers is determined. In some examples, a list of the exponent values is generated.

The method 700 then groups the mantissa portions of the floating point numbers based on the identified exponent values at 706. For example, the mantissas can be grouped spatially or by grouping the mantissas of each floating point number having the same exponent value, among other grouping techniques. In various examples, each of the exponent values in the above-described list has at least one floating point number associated therewith. A global shared exponent is then selected for each set of the grouped mantissa portions according to the shared exponent values at 708 and removed from the grouped mantissas, to thereby define multi-tiered shared exponents. For example, the global shared exponent can be selected based on the original exponents for the floating point numbers. As described herein, the method 700 can identify the value for the global shared exponent by determining one of a maximum exponent value, a minimum exponent value or an average exponent value based on each of the original exponent values corresponding to the grouped mantissas. The shared exponent value is factored out of all of the sets of grouped mantissas (see Eq. 6) to thereby define a multi-tiered shared exponent block floating point format. Thus, each of the exponents for the corresponding groups of mantissas have a reduced exponent value, the common or shared exponent having been factored out. As such, the above-described process determines an aggregate component to be factored out from each of the sets of grouped mantissas.

The method 700 then performs operations on the multi-tiered shared exponent block floating point numbers, which involves simpler mathematical operations, such as integer arithmetic operations of multiplication and addition. In one example, one or more dot product operations is performed separately on the grouped mantissa portions of each group of the multi-tiered shared exponent block floating point numbers at 710 (i.e., grouped mantissas with the global shared exponent factored out) to obtain individual results.

Shifting operations are then performed to generate a final dot product value at 712. The shifting accounts for the offset in the different original exponent values from the floating point numbers (e.g., $2^5$ and $2^4$). For example, the shifting can be the shifting operation performed by the shifters 614 (shown in FIG. 6). The results of the individual shift operations are then shifted (e.g., using the shifting operation 618 shown in FIG. 6) and used to implement the neural network at 714. For example, the results of the computations using the multi-tiered shared exponent block floating point numbers is used to train or operate the neural network.

Thus, the multi-tiered shared exponent block floating point computations can be used in the operation or in the training process for the neural network in various examples (e.g., training involves using a training algorithm such as to update parameters of the neural network in an iterative process). The computations, such as the iterative process that is performed during neural network training, can be time consuming and computationally expensive since the number of parameters to be updated is large (in the case of deep neural networks) and the amount of training data is also large. The present disclosure handles the demands of the training process by improving the accuracy of the operations performed during training the neural network (or running the neural network after being trained) when a faster multi-tiered shared exponent block floating format is used for the computations.

It should be noted that the present disclosure can be implemented in a neural network having a layered configuration with a layer of input nodes, one or more layers of hidden units and at least one output layer. During use of the neural network at test time (i.e., after training) as a signal passes through a layer, the signal produces an output via the activations that becomes the input to the next layer of the neural network and so on, until the signal reaches the output layer and the output units are activated. The pattern of activations at the output layer gives the prediction of the neural network. The pattern of activations is influenced by the weights learned during the training phase or stage.

With reference now to the method 800 illustrated in FIG. 8, at 802, floating point numbers are received. In various examples, and as discussed herein, the floating point numbers are each defined by a sign, exponent and mantissa. The floating point numbers are in, for example, a reduced precision floating point format, such as 16-bit float or 8-bit float instead of a higher precision floating point format, such as 32-bit float.

Exponents for each of the floating point numbers are determined at a reduced granularity at 804. As described herein, different sharing configurations for the floating point numbers in a matrix received by the method 800 can be used as illustrated in FIG. 5. The sharing configuration selected is based on a desired or required level of reduced granularity.

The mantissas are grouped at 806, which can include spatially grouping the mantissas in some examples or using a determined exponent value in other examples. For example, mantissas in a sequential order or mantissas having the same exponent value (based on the sharing configuration) are grouped together.

An aggregate component, such as the global shared exponent, is then determined at 808 as a shared exponent. That is, a common or global exponent value for each of the sets of grouped mantissas is determined. In the illustrated example, the aggregate component is determined using a first criteria, such as a maximum absolute value determination as described herein. With the aggregate component calculated, a determination is made whether there is an acceptable offset at 810. For example, a determination is made whether an acceptable accuracy level results, as determined based on the aggregate component. If the offset is not acceptable, then at 812, a different exponent is selected. The aggregate component is then determined again at 810. A determination is then again made at 810 as to whether there is an acceptable offset. This process can be repeated with different criteria to determine, for example, an aggregate exponent that gives the most consistent set of offsets, using, for example, the maximum absolute value determination, an absolute minimum value determination or an average value determination (which may be the most acceptable approach if the exponent values have a larger spread).

When a determination is made 810 that there is an acceptable offset, computations are performed on the multi-tiered shared exponent block floating point numbers at 814. For example, as described herein, using the multi-tiered shared exponent block floating point numbers, computations for operating or training a neural network may be performed with reduced latency, while maintaining accuracy.

As should be appreciated, when the present disclosure is implemented in the training process for neural networks, this generally involves using a training algorithm to update parameters of the neural network in an iterative process, such as to update weights of the neural network, which in various examples is performed using the multi-tiered shared exponent block floating point numbers that are shifted at one or more operations. Moreover, the neural network is a collection of nodes interconnected by edges and where there are weights associated with the nodes and/or edges. In some examples, one or more of the nodes in the neural network is modified to slightly change the way the neural network operates. Thus, the outputs themselves are not directly changed, but indirectly changed by changing how the nodes operate to generate the outputs using calculations performed according to the present disclosure.

Thus, in some examples, the method 700 or 800 can be used to perform computations implementing the multi-tiered shared exponent block floating point numbers for training or operating neural networks.

Exemplary Operating Environment

Figure 9:
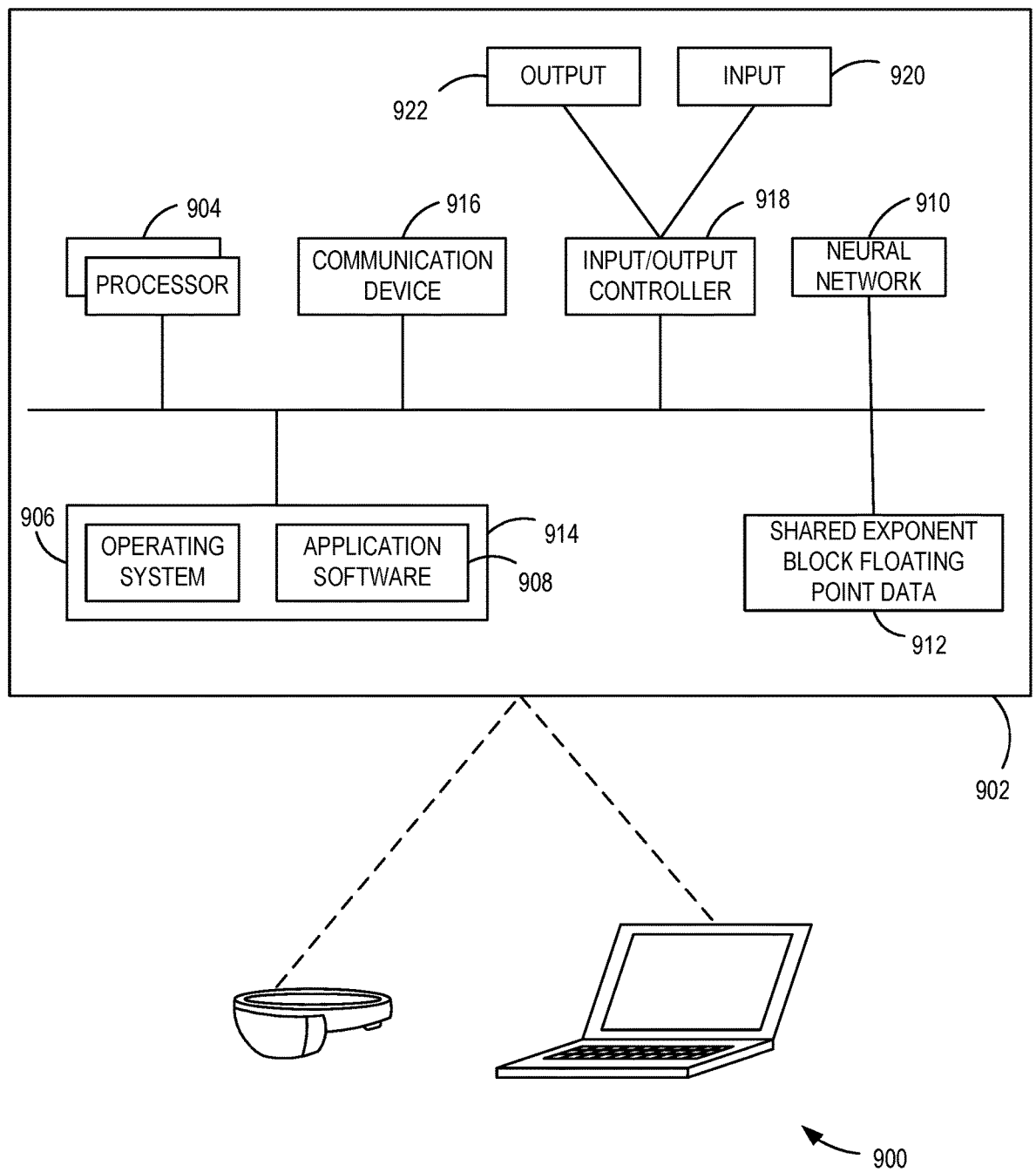
FIG. 9 illustrates a computing apparatus according to an embodiment as a functional block diagram.

The present disclosure is operable with a computing apparatus 902 according to an embodiment as a functional block diagram 900 in FIG. 9. In one example, components of the computing apparatus 902 may be implemented as a part of an electronic device according to one or more embodiments described in this specification. The computing apparatus 902 comprises one or more processors 904 which may be microprocessors, controllers or any other suitable type of processors for processing computer executable instructions to control the operation of the electronic device. Platform software comprising an operating system 906 or any other suitable platform software may be provided on the apparatus 902 to enable application software 908 to be executed on the device. According to an embodiment, a neural network 910 that operates or is trained using shared exponent block floating point data 912 can be accomplished by software.

Computer executable instructions may be provided using any computer-readable media that are accessible by the computing apparatus 902. Computer-readable media may include, for example, computer storage media such as a memory 914 and communications media. Computer storage media, such as the memory 914, include volatile and non-volatile, removable and non-removable media implemented in any method or technology for storage of information such as computer readable instructions, data structures, program modules or the like. Computer storage media include, but are not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing apparatus. In contrast, communication media may embody computer readable instructions, data structures, program modules, or the like in a modulated data signal, such as a carrier wave, or other transport mechanism. As defined herein, computer storage media do not include communication media. Therefore, a computer storage medium should not be interpreted to be a propagating signal per se. Propagated signals per se are not examples of computer storage media. Although the computer storage medium (the memory 914) is shown within the computing apparatus 902, it will be appreciated by a person skilled in the art, that the storage may be distributed or located remotely and accessed via a network or other communication link (e.g. using a communication interface 916).

The computing apparatus 902 may comprise an input/output controller 918 configured to output information to one or more input devices 920 and output devices 922, for example a display or a speaker, which may be separate from or integral to the electronic device. The input/output controller 918 may also be configured to receive and process an input from the one or more input devices 920, for example, a keyboard, a microphone or a touchpad. In one embodiment, the output device 922 may also act as the input device 920. An example of such a device may be a touch sensitive display. The input/output controller 918 may also output data to devices other than the output device 922, e.g. a locally connected printing device. In some embodiments, a user may provide input to the input device(s) 720 and/or receive output from the output device(s) 922.

In some examples, the computing apparatus 902 detects voice input, user gestures or other user actions and provides a natural user interface (NUI). This user input may be used to author electronic ink, view content, select ink controls, play videos with electronic ink overlays and for other purposes. The input/output controller 918 outputs data to devices other than a display device in some examples, e.g. a locally connected printing device.

NUI technology enables a user to interact with the computing apparatus 702 in a natural manner, free from artificial constraints imposed by input devices such as mice, keyboards, remote controls and the like. Examples of NUI technology that are provided in some examples include but are not limited to those relying on voice and/or speech recognition, touch and/or stylus recognition (touch sensitive displays), gesture recognition both on screen and adjacent to the screen, air gestures, head and eye tracking, voice and speech, vision, touch, gestures, and machine intelligence. Other examples of NUI technology that are used in some examples include intention and goal understanding systems, motion gesture detection systems using depth cameras (such as stereoscopic camera systems, infrared camera systems, red green blue (rgb) camera systems and combinations of these), motion gesture detection using accelerometers/gyroscopes, facial recognition, three dimensional (3D) displays, head, eye and gaze tracking, immersive augmented reality and virtual reality systems and technologies for sensing brain activity using electric field sensing electrodes (electro encephalogram (EEG) and related methods).

The functionality described herein can be performed, at least in part, by one or more hardware logic components. According to an embodiment, the computing apparatus 702 is configured by the program code when executed by the processor(s) 704 to execute the embodiments of the operations and functionality described. Alternatively, or in addition, the functionality described herein can be performed, at least in part, by one or more hardware logic components. For example, and without limitation, illustrative types of hardware logic components that can be used include FPGAs, ASICs, ASSPs, SOCs, CPLDs, and GPUs.

At least a portion of the functionality of the various elements in the figures may be performed by other elements in the figures, or an entity (e.g., processor, web service, server, application program, computing device, etc.) not shown in the figures.

Although described in connection with an exemplary computing system environment, examples of the disclosure are capable of implementation with numerous other general purpose or special purpose computing system environments, configurations, or devices.

Examples of well-known computing systems, environments, and/or configurations that may be suitable for use with aspects of the disclosure include, but are not limited to, mobile or portable computing devices (e.g., smartphones), personal computers, server computers, hand-held (e.g., tablet) or laptop devices, multiprocessor systems, gaming consoles or controllers, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, and the like. In general, the disclosure is operable with any device with processing capability such that it can execute instructions such as those described herein. Such systems or devices may accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein.

In examples involving a general-purpose computer, aspects of the disclosure transform the general-purpose computer into a special-purpose computing device when configured to execute the instructions described herein.

Other examples include:

A system for block floating point computation in a neural network, the system comprising:
at least one processor; and
at least one memory comprising computer program code, the at least one memory and the computer program code configured to, with the at least one processor, cause the at least one processor to:
receive a plurality of floating point numbers each comprising a mantissa portion and an exponent portion;
identify an exponent value for the exponent portion of each floating point number of the plurality of floating point numbers;
group the mantissa portions of the floating point numbers;
select, according to the identified exponent values, a shared exponent value of the grouped mantissa portions;
remove the selected, shared exponent value from the grouped mantissa portions to define multi-tiered shared exponent block floating point numbers;
perform one or more dot product operations on the grouped mantissa portions of the multi-tiered shared exponent block floating point numbers to obtain individual results;
shift the individual results based on the shared exponent to generate a final dot product value; and
use the final dot product value to implement the neural network.

Other examples include:

A computerized method for block floating point computation in a neural network, the computerized method comprising:
receiving a plurality of floating point numbers each comprising a mantissa portion and an exponent portion;
converting the plurality of floating point numbers to a plurality of multi-tiered block floating point numbers having at least one global shared exponent and one additional exponent for each of a plurality of grouped mantissas;
performing one or more dot product operations using the plurality of multi-tiered shared exponent block floating point numbers; and
using a result of performing the one or more dot product operations to implement the neural network.

Other examples include:

One or more computer storage media having computer-executable instructions for block floating point computation that, upon execution by a processor, cause the processor to at least:
receive a plurality of floating point numbers each comprising a mantissa portion and an exponent portion;
identify an exponent value for the exponent portion of each floating point number of the plurality of floating point numbers;
group the mantissa portions of the floating point numbers;
select, according to the identified exponent values, a shared exponent value of the grouped mantissa portions;
remove the selected, shared exponent value from the grouped mantissa portions to define multi-tiered shared exponent block floating point numbers;
perform one or more dot product operations on the mantissa portions of the multi-tiered shared exponent block floating point numbers to obtain individual results;

shift the individual results based on the shared exponent to generate a final dot product value; and use the final dot product value to implement the neural network.

Alternatively, or in addition to the examples described above, examples include any combination of the following:

selecting the shared exponent value by determining one of a maximum exponent value or a minimum exponent value based at least on the identified exponent values to define a global shared exponent and a finer granularity shared exponent for each of the grouped mantissas.

selecting the shared exponent value by determining an average exponent value of the identified exponent values to define a global shared exponent and a finer granularity shared exponent for each of the grouped mantissas.

defining a granularity for selecting the shared exponent using at least one of a per-matrix sharing, a per-column sharing and a tiling sharing and wherein the grouped mantissas are grouped one of spatially or according to the identified exponent values.

performing one or more dot product operations on only matrix-vector multiplies.

wherein the plurality of floating point numbers comprises numbers having a 16-bit float format or less.

further comprising one or more Field-programmable Gate Arrays (FPGAs) and wherein the one or more dot product operations and the shifting are performed by the one or more FPGAs.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The embodiments illustrated and described herein as well as embodiments not specifically described herein but within the scope of aspects of the claims constitute exemplary means for training a neural network. The illustrated one or more processors 904 together with the computer program code stored in memory 914 constitute exemplary processing means for using and/or training neural networks.

The term "comprising" is used in this specification to mean including the feature(s) or act(s) followed thereafter, without excluding the presence of one or more additional features or acts.

In some examples, the operations illustrated in the figures may be implemented as software instructions encoded on a computer readable medium, in hardware programmed or designed to perform the operations, or both. For example, aspects of the disclosure may be implemented as a system on a chip or other circuitry including a plurality of interconnected, electrically conductive elements.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A system for block floating point computation in a neural network, the system comprising:

at least one processor; and at least one memory comprising computer program code, the at least one memory and the computer program code configured to, with the at least one processor, cause the at least one processor to:

receive a plurality of floating point numbers each comprising a mantissa portion and an exponent portion;

identify an exponent value for the exponent portion of each floating point number of the plurality of floating point numbers;

group the mantissa portions of the floating point numbers;

select, according to the identified exponent values, a shared exponent value corresponding to each of the grouped mantissa portions;

remove the selected, shared exponent value from each of the grouped mantissa portions to define multi-tiered shared exponent block floating point numbers having the shared exponent value factored out from and common to each of the grouped mantissa portions and one additional exponent remaining for each of the grouped mantissa portions after the shared exponent value is factored out;

perform one or more dot product operations on the grouped mantissa portions of the multi-tiered shared exponent block floating point numbers to obtain individual results;

shift the individual results to generate a final dot product value; and use the final dot product value to implement the neural network.

2. The system of claim 1, wherein the at least one memory and the computer program code are further configured to, with the at least one processor, cause the at least one processor to select the shared exponent value by determining one of a maximum exponent value or a minimum exponent value based at least on the identified exponent values to define the shared exponent value as a global shared exponent and the one additional exponent as a finer granularity shared exponent for each of the grouped mantissas.

3. The system of claim 1, wherein the at least one memory and the computer program code are further configured to, with the at least one processor, cause the at least one processor to select the shared exponent value by determining an average exponent value of the identified exponent values to define the shared exponent value as a global shared exponent and the one additional exponent as a finer granularity shared exponent for each of the grouped mantissas.

4. The system of claim 1, wherein the at least one memory and the computer program code are further configured to, with the at least one processor, cause the at least one processor to define a granularity for selecting the shared exponent value for a matrix used in the one or more dot product operations using at least one of a per-matrix sharing, a per-column sharing and a tiling sharing and wherein the grouped mantissas are grouped one of spatially or according to the identified exponent values.

5. The system of claim 1, wherein the at least one memory and the computer program code are further configured to, with the at least one processor, cause the at least one processor to perform one or more dot product operations applied only to matrix-vector multiplies.

6. The system of claim 1, wherein the plurality of floating point numbers comprises numbers having a 16-bit float format or less.

7. The system of claim 1, wherein the at least one processor comprises one or more Field-programmable Gate Arrays (FPGAs) and wherein the one or more dot product operations and the shifting are performed by the one or more FPGAs.

8. A computerized method for block floating point computation in a neural network, the computerized method comprising:
receiving a plurality of floating point numbers each comprising a mantissa portion and an exponent portion;
converting the plurality of floating point numbers to a plurality of multi-tiered shared exponent block floating point numbers having at least one global shared exponent and one additional exponent for each of a plurality of grouped mantissas;
performing one or more dot product operations using the plurality of multi-tiered shared exponent block floating point numbers; and
using a result of performing the one or more dot product operations to implement the neural network.

9. The computerized method of claim 8, wherein converting the plurality of floating point numbers to a plurality of block floating point numbers comprises identifying an exponent value for the exponent portion of each floating point number of the plurality of floating point numbers, grouping the mantissas of the floating point numbers spatially or based on the identified exponent values, selecting as the at least one global shared exponent a shared exponent value that is factored from the grouped mantissas, and shifting the result of performing the one or more dot product operations to generate a final dot product value.

10. The computerized method of claim 9, further comprising selecting the at least one shared exponent value by determining one of a maximum exponent value or a minimum exponent value based at least on the identified exponent values to define the shared exponent value as a global shared exponent and the one additional exponent as a finer granularity shared exponent for each of the grouped mantissas.

11. The computerized method of claim 9, further comprising selecting the at least one shared exponent value by determining an average exponent value of the identified exponent values to define a global shared exponent and a finer granularity shared exponent for each of the grouped mantissas.

12. The computerized method of claim 8, further comprising defining a granularity for selecting the at least one shared exponent value for a matrix used in the one or more dot product operations using at least one of a per-matrix sharing, a per-column sharing and a tiling sharing.

13. The computerized method of claim 8, further comprising performing the one or more dot product operations applied only to matrix-vector multiplies.

14. The computerized method of claim 8, wherein the plurality of floating point numbers comprises numbers having a 16-bit float format or less.

15. The computerized method of claim 8, further comprising performing the one or more dot product operations with one or more Field-programmable Gate Arrays (FPGAs).

16. One or more computer storage media having computer-executable instructions for block floating point computation that, upon execution by a processor, cause the processor to at least:
receive a plurality of floating point numbers each comprising a mantissa portion and an exponent portion;
identify an exponent value for the exponent portion of each floating point number of the plurality of floating point numbers;
group the mantissa portions of the floating point numbers;
select, according to the identified exponent values, a shared exponent value corresponding to each of the grouped mantissa portions;
remove the selected, shared exponent value from each of the grouped mantissa portions to define multi-tiered shared exponent block floating point numbers having the shared exponent value factored out from and common to each of the grouped mantissa portions and one additional exponent remaining for each of the grouped mantissa portions after the shared exponent value is factored out;
perform one or more dot product operations on the grouped mantissa portions of the multi-tiered shared exponent block floating point numbers to obtain individual results;
shift the individual results to generate a final dot product value; and
use the final dot product value to implement the neural network.

17. The one or more computer storage media of claim 16 having further computer-executable instructions that, upon execution by a processor, cause the processor to at least select the shared exponent value by determining one of a maximum exponent value based at least on the identified exponent values, a minimum exponent value based at least on the identified exponent values or an average exponent value of the identified exponent values to define the shared exponent value as a global shared exponent and the one additional exponent as a finer granularity shared exponent for each of the grouped mantissas.

18. The one or more computer storage media of claim 16 having further computer-executable instructions that, upon execution by a processor, cause the processor to at least define a granularity for selecting the shared exponent value for a matrix used in the one or more dot product operations using at least one of a per-matrix sharing, a per-column sharing and a tiling sharing.

19. The one or more computer storage media of claim 16 having further computer-executable instructions that, upon execution by a processor, cause the processor to at least perform one or more dot product operations applied only to matrix-vector multiplies.

20. The one or more computer storage media of claim 16, wherein the plurality of floating point numbers comprises numbers having a 16-bit float format or less.

* * * * *